United States Patent [19]

Ryder

[11] Patent Number: 4,858,370
[45] Date of Patent: Aug. 22, 1989

[54] FISHING LURE FOR SIMULATED FEEDING

[75] Inventor: Francis E. Ryder, Arab, Ala.

[73] Assignee: Ryder International Corporation, Arab, Ala.

[21] Appl. No.: 218,091

[22] Filed: Jul. 12, 1988

[51] Int. Cl.$^4$ ............................................. A01K 95/00
[52] U.S. Cl. .................................. 43/43.13; 43/42.5; 43/42.26
[58] Field of Search ................... 43/42.03, 42.5, 42.27, 43/42.26, 42.13, 4

[56] References Cited

U.S. PATENT DOCUMENTS

| | | | |
|---|---|---|---|
| 1,963,380 | 6/1934 | Peters et al. | 43/42.5 |
| 2,179,597 | 11/1939 | Palsson | 43/42.5 |
| 3,094,804 | 6/1963 | Walton et al. | 43/42.5 |
| 3,940,872 | 3/1976 | Weber | 43/43.13 |
| 4,028,839 | 6/1977 | Stubblefield | 43/42.03 |
| 4,180,936 | 1/1980 | Davis | 43/42.5 |
| 4,317,305 | 3/1982 | Firmin | 43/42.26 |
| 4,594,806 | 6/1986 | Brown | 43/42.27 |

FOREIGN PATENT DOCUMENTS 1010313  6/1957  Fed. Rep. of Germany ..... 43/43.13
1313296  11/1961  France ............................... 43/43.13

Primary Examiner—Kurt Rowan
Attorney, Agent, or Firm—R. A. Giangiorgi

[57] ABSTRACT

An improved fishing lure attains a combined jumping and weaving motion to closely simulate the movement of a feeding fish. The lure can be molded of plastic and includes a central body having a generally vertically planar configuration, and a profile generally resembling a fish. The lure has a pair of pectoral fin members, preferably integrally molded with the body, which extend laterally from the respective opposite sides of the body. The pectoral fin members cause deflection of water during trolling advancement of the lure which deflection produces elevating propulsion of the lure in relation to the water level and the direction of the lure advancement through the water. The lure also includes a pivotal free moving rudder which is mounted below the body and pivots laterally with respect to the body in order to deflect water and produces random lateral motion of the lure in relation to the trolling direction of advancement. The lateral weaving of the lure augments the jumping motion and thus simulates the movements or actions of a feeding fish.

8 Claims, 1 Drawing Sheet

FISHING LURE FOR SIMULATED FEEDING

BACKGROUND OF THE INVENTION

This invention relates to fishing lures, and more particularly relates to lures designed for attraction without hookup of target fish.

A common technique for boat fishing is to employ outriggers pulling the baited hooks while at the same time pulling an unhooked lure which repeatedly jumps into the air in the manner of a porpoise and which simulates the similar motion of feeding fish. This simulated fish feeding motion of the lure stimulates the schooling instinct of target fish which are attracted by the action of the lure promoting their movement upwards wherein they may be caught with the baited and hook-containing lures.

Previous efforts to attract fish have used an elongate length of wood to which a cross-piece or wings have been secured serving as foils which promote motion of the of the lure.

In contrast, the lure according to the subject invention not only produces an attractive jumping action but in addition, produces a lateral motion of the lure in relation to the direction of the trolling advancement of the boat and lure through the water. In addition, the lure can be molded from plastic material in order to enable rapid fabrication for commercial production.

SUMMARY OF THE INVENTION

In accordance with this invention, the improved fishing lure attains a combined jumping and weaving motion to closely simulate the movement of a feeding fish. The lure can be molded of plastic and includes a central body having a generally vertically planar configuration, and a profile generally resembling a fish. The lure has a pair of pectoral fin members, preferably integrally molded with the body, which extend laterally from the respective opposite sides of the body. Each of the pectoral fin members preferably has a curved contour for causing deflection of water during trolling advancement of the lure which deflection produces elevating propulsion of the lure in relation to the water level and the direction of the lure advancement through the water. The lure also includes a pivotal free moving rudder which is mounted below from the body and pivots laterally with respect to the body in order to deflect water and produces random lateral motion of the lure in relation to the trolling direction of advancement. The lateral weaving of the lure augments the jumping motion and thus simulates the movements or actions of a feeding fish.

In a preferred embodiment, the pectoral fins extend from the respective sides along the entire length of the body. Each of the pectoral fins is curved downwardly from a head-shaped portion of the body to a medial portion and curves upwardly therefrom to a tail-shaped portion of the body. Further, the lateral extensions of the pectoral fins are located at the downwardly curving portions of the fins in order to enlarge the surface resistance and elevating propulsion of the trolling lure. Stop members are provided on the lower surface of the pectoral fins to limit the respective lateral pivot motions of the rudder.

DESCRIPTION OF THE ILLUSTRATED EMBODIMENT

Figure 1:
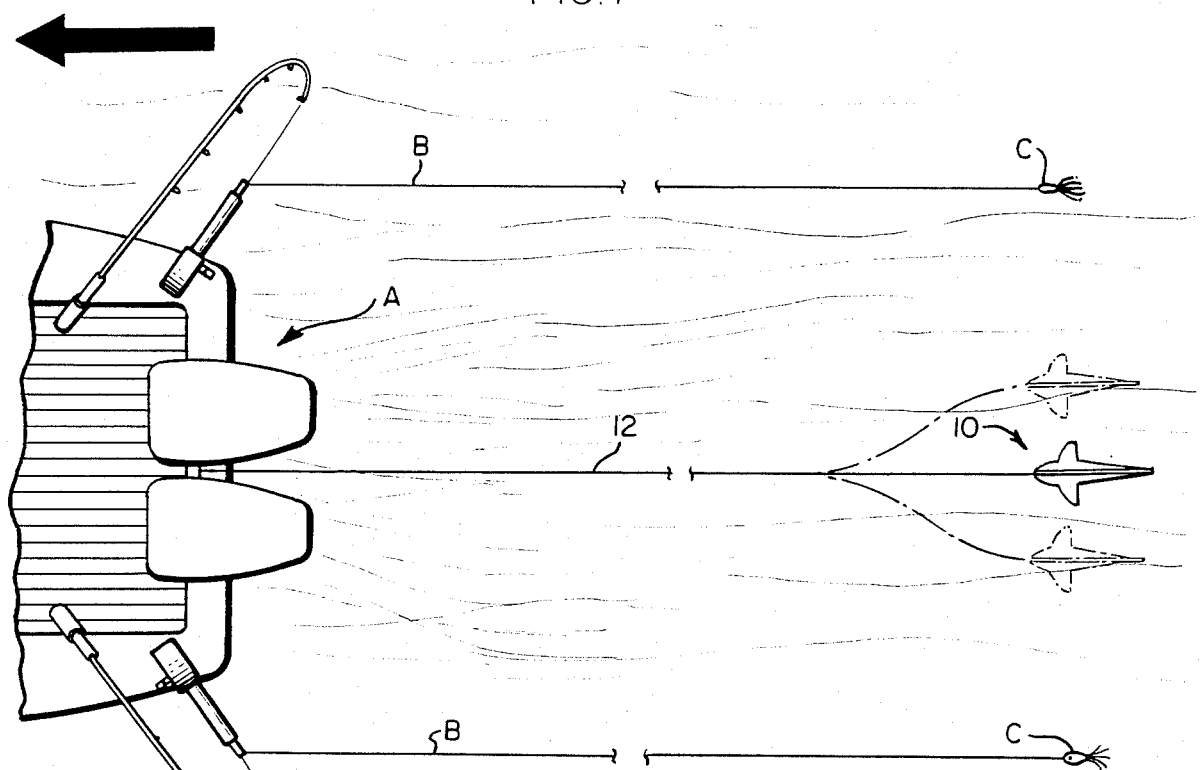
FIG. 1 is a schematic view of en embodiment of the fishing lure in accordance with the invention being pulled in a trolling manner from the rear of a boat and flanked by similarly pulled outriggers.

Referring to FIG. 1, an embodiment of the lure according to the invention is designated generally by reference character 10. The lure 10 is shown at the end of a central leader line 12 which is pulled in a trolling manner from the rear of a fishing boat A. Typically, the lure 10 will be flanked by outrigger lines B securing the hooked lures C for the target fish.

The lure 10 will plane near the surface of the water, while the hooked lures C are positioned at a greater depth. The lure 10 will move from side-to-side as indicated in phantom in FIG. 1. In addition the lure 10 will also "jump" or leap out of the water in a porpoising type of motion. This combined motion, viz., side-to-side plus porpoising, simulates the motion or actions of a feeding fish. The target fish, not shown, will be attracted to this motion and their natural curiosity will cause them to rise to investigate. As the target fish rise they will encounter the hooked lures C, and hopefully will strike on the lures C.

Figure 2:
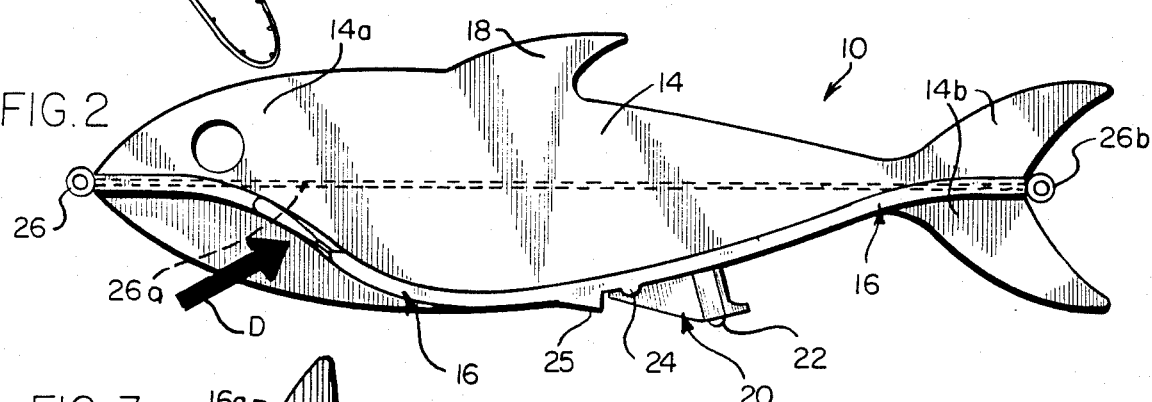
FIG. 2 is a side elevtion view of the fishing lure shown in Fig. 1, illustrating the curvature of the full-length pectoral fins and rudder structure.
Figure 3:
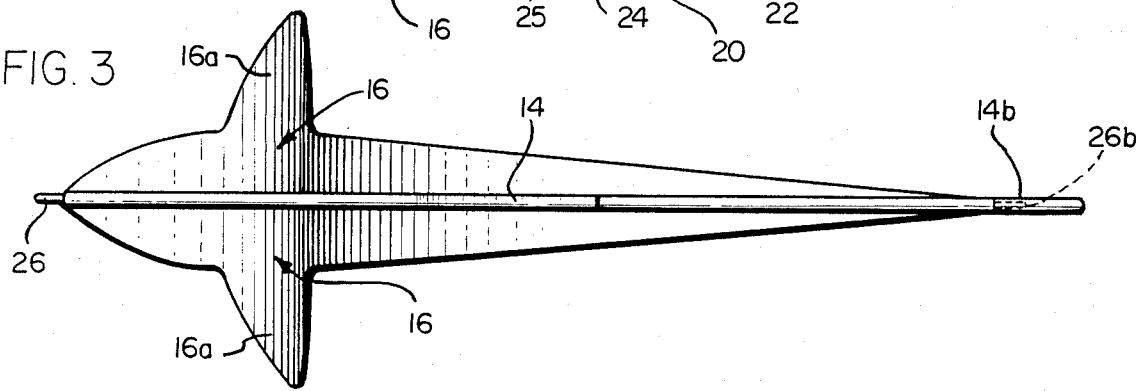
FIG. 3 is a top plan view of the lure shown in FIGS. 1 and 2.

Referring to FIGS. 2 and 3, the structure or construction of the lure 10 will be considered. The lure 10 can be molded of a plastic material and includes a generally vertically planar, elongate body 14 in order to promote a generally streamlined and lightweight structure of the lure and as little resistance as possible to the trolling advancement of the lure despite a body length of, for example, 15 inches or greater. The lure 10 also has a pair of pectoral fin or flange members 16 which extend laterally from respective opposite sides of the vertically planar body 14. In the illustrated preferred embodiment, each of the pectoral fins or flanges 16 extends laterally over the entire length of the body 14 from the head-shaped portion 14a and tapering toward the tail-shaped body portion 14b. As such, when viewed from below the lure will project the silhouette of a full bodied fish.

Additionally each of the pectoral fins 16 has a curved contour which will cause deflection of water during the trolling advancement of the lure so that the deflection produces an elevating propulsion of the lure in relation to the water level and the direction of advancement. The pectoral fin contour and elevating propulsion enables the lure to plane at the surface of the water and and periodically jump or porpoise from the water in the manner of a feeding fish. As discussed above this movement will attract target fish which can be hooked on the laterally trolling lures C.

Generally, each of the pectoral fins or flanges 16 curves downwardly from the head portion 14a to the medial portion and then curves upwardly toward the tail portion 14b. Each of the pectoral fins 16 has a laterally further extending fin projection 16a at the downwardly curving portion of the fin 16 in order to promote the elevating reaction force D on the lure 10 resulting from the resistance of the pectoral fins to the trolling direction of advancement through the water. The tail portion 14b of the body has the configuration of vertically opposed pelvic fin portions in order to stabilize the vertical orientation of the body 14 during the trolling advancement. A dorsal fin 18 can also be provided on the body 14.

Figure 4:
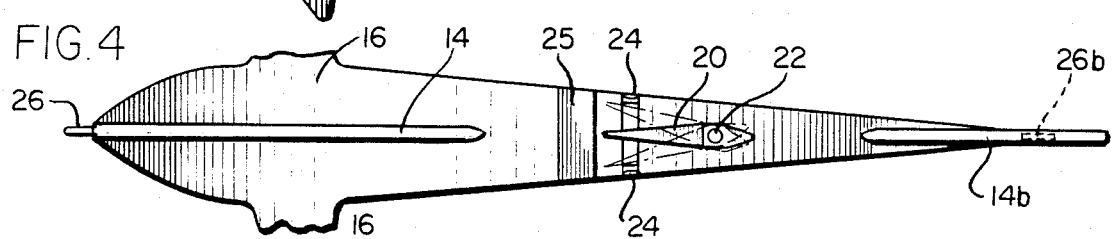
FIG. 4 is a fragmentary, bottom plan view of the lure and rudder structure shown in FIG. 2.

Referring again to FIG. 2, a rudder member 20 is pivotally secured to the bottom of the body 14. As best shown in FIG. 4, the rudder 20 can laterally pivot toward either side of the vertically planar body 14 so that in laterally pivoted positions the rudder will deflect water to produce lateral motion of the lure in relation to the trolling direction of advancement. The movement of the ruddeer 20 is uncontrolled, so that the lateral motion of the lure is random and erractic. The rudder 20 is mounted on a generally vertically projecting pivot bearing pin 22 which can be threaded or otherwise secured to the body 14. In order to prevent excessive lateral pivot of the rudder 20, a pair of stop members 24 can be provided on the bottom surface of the respective fins 16 to limit the respective extremes of pivot. The stops may be adjustable, to control the degree of lateral movement allowed. As shown in FIGS. 2 and 4, an integrally molded wedge-shaped bridge formation 25 is provided across the bottom of the pectoral fins 16 just forward to the rudder 20. The wedge-shaped bridge will influence the flow of water toward the rudder 20 and will promote the direction of water at the rudder to insure the desired lateral response motion of the lure.

As the forward end of the lure 10, a ring 26 is provided, which serves as the linkage for the leader line 12, is secured to the end of the head portion 14a. The ring 26 is fabricated from a metallic wire 26a which is insert molded into the body 14. The wire 26a extends through the entire length of the body 14 and terminates in a ring 26b proximate the tail portion 14b. The wire 26a provides overall strength to the lure.

The combination of the pectoral fin or flange 16 contour and lateral pivot of the rudder 20 result in both humping and lateral motion of the trolling lure to simulate the motion of a feeding fish and the consequent attraction of target fish.

While a preferred embodiment of the fishing lure of the invention is illustrated and described, it is envisioned that those skilled in lure design may devise various modifications guided by this description. Accordingly, the invention is not limited to the specifically described embodiment and is defined by the scope of the appended claims.

The invention is claimed as follows:

1. A fishing lure for trolling through water and simulating the motion of a feeding fish comprising: an elongate central body having a vertically planar configuration in order to promote elevating propulsion of the lure; a pair of pectoral fin members extending laterally from respective opposite sides of said body and having a curved contour which is entirely perpendicular to said vertically planar body for causing deflection of water during trolling advancement of the lure through the water to produce said elevating propulsion of the lure in relation to the direction of said advancement; and a pivotal rudder member mounted below said body and located underneath said body during said trolling, and pivoting with respect thereto for deflecting water in order to cause lateral random motion of the lure in relation to said direction of advancement.

2. The lure according to claim 1 wherein said rudder member is pivoted on a pivot bearing means which is secured to said body.

3. The lure according to claim 1 further comprising a tail member vertically extending from a rearward portion of said body for guiding the lure in said direction of advancement.

4. The lure according to claim 1 wherein at least one of said pectoral fin members includes a rearwardly projecting portion thereof extending from said respective side of said body and terminating adjacent the rearward end of said body.

5. The lure according to claim 1 wherein at least one of said pectoral fin members includes a forwardly projecting portion thereof extending from said respective side of said body and terminating adjacent the forward end of said body.

6. The lure according to claim 1 wherein each of said pectoral fin members includes a rearwardly projecting portion extending from said respective side of said body and terminating adjacent the rearward end of said body, each of said pectoral fin members further including a forwardly projecting portion extending from said respective side of said body and terminating adjacent the forward end of said body.

7. The lure according to claim 6 wherein said contour of each said pectoral fin is downwardly curved from said forwardly projecting portion to a medial portion of said pectoral fin and is upwardly curved from said medial portion to said rearwardly projecting portion.

8. The lure according to claim 1, wherein a wedged-shaped bridge portion is positional forward of said rudder member for directing water thereagainst and preventing cavitation.

* * * * *